(12) United States Patent
Martin et al.

(10) Patent No.: US 11,396,687 B2
(45) Date of Patent: Jul. 26, 2022

(54) FEEDSTOCKS FOR ADDITIVE MANUFACTURING, AND METHODS OF USING THE SAME

(71) Applicant: HRL Laboratories, LLC, Malibu, CA (US)

(72) Inventors: John H. Martin, Oxnard, CA (US); Brennan D. Yahata, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 653 days.

(21) Appl. No.: 16/180,696

(22) Filed: Nov. 5, 2018

(65) Prior Publication Data
US 2019/0106771 A1 Apr. 11, 2019

Related U.S. Application Data

(63) Continuation of application No. 15/996,438, filed on Jun. 2, 2018, now abandoned.
(Continued)

(51) Int. Cl.
*C22C 21/10* (2006.01)
*B23K 26/342* (2014.01)
(Continued)

(52) U.S. Cl.
CPC ............ *C22C 21/10* (2013.01); *B23K 26/342* (2015.10); *B33Y 10/00* (2014.12); *B33Y 70/00* (2014.12); *B23K 2103/50* (2018.08)

(58) Field of Classification Search
None
See application file for complete search history.

(56) References Cited

U.S. PATENT DOCUMENTS

| | | | |
|---|---|---|---|
| 4,954,188 A * | 9/1990 | Ponchel | C22C 21/10 148/417 |
| 5,305,726 A | 4/1994 | Scharman et al. | |

(Continued)

FOREIGN PATENT DOCUMENTS

| | | | |
|---|---|---|---|
| CN | 102974955 A | * | 3/2013 |
| JP | 2008045157 A | * | 2/2008 |

(Continued)

OTHER PUBLICATIONS

Anderson, Kevin, "7075 and Alclad 7075 High Strength Structural Alloy", ASM Handbook, vol. 2B,Properties and Selection of Aluminum Alloys, pp. 432-438. (Year: 2019).*

(Continued)

*Primary Examiner* — Geoffrey S Evans
(74) *Attorney, Agent, or Firm* — O'Connor & Company; Ryan P. O'Connor

(57) ABSTRACT

Some variations provide a method of making an additively manufactured metal component, comprising: providing a feedstock that includes a high-vapor-pressure metal; exposing a first amount of the feedstock to an energy source for melting; and solidifying the melt layer, thereby generating a solid layer of an additively manufactured metal component. The metal-containing feedstock is enriched with a higher concentration of the high-vapor-pressure metal compared to its concentration in the additively manufactured metal component. The high-vapor-pressure metal may be selected from Mg, Zn, Li, Al, Cd, Hg, K, Na, Rb, Cs, Mn, Be, Ca, Sr, or Ba, for example. Additively manufactured metal components are provided. Metal-containing feedstocks for additive manufacturing are also disclosed, wherein concentration of at least one high-vapor-pressure metal in the feedstock is selected based on a desired concentration of the high-vapor-pressure metal in an additively manufactured metal compo- (Continued)

nent derived from the metal-containing feedstock. Various feedstock compositions are disclosed.

13 Claims, 3 Drawing Sheets

Related U.S. Application Data

(60) Provisional application No. 62/540,615, filed on Aug. 3, 2017.

(51) Int. Cl.
  B33Y 70/00  (2020.01)
  B33Y 10/00  (2015.01)
  B23K 103/00 (2006.01)

(56) References Cited

U.S. PATENT DOCUMENTS

| | | |
|---|---|---|
| 5,340,012 A | 8/1994 | Beeferman et al. |
| 5,462,712 A | 10/1995 | Langan et al. |
| 6,024,915 A | 2/2000 | Kume et al. |
| 6,071,628 A | 6/2000 | Seals et al. |
| 6,254,757 B1 | 7/2001 | Lashmore et al. |
| 6,368,427 B1 | 4/2002 | Sigworth |
| 9,238,877 B2 | 1/2016 | Krause et al. |
| 2002/0136884 A1 | 9/2002 | Oechsner |
| 2003/0077473 A1 | 4/2003 | Bretschneider et al. |
| 2003/0104147 A1 | 6/2003 | Bretschneider et al. |
| 2005/0079085 A1* | 4/2005 | Ichikawa ............... C22C 21/10 419/28 |
| 2005/0238528 A1 | 10/2005 | Lin et al. |
| 2006/0065330 A1 | 3/2006 | Cooper et al. |
| 2010/0288243 A1 | 11/2010 | Kaburagi et al. |
| 2012/0135142 A1 | 5/2012 | Yang et al. |
| 2012/0315399 A1 | 12/2012 | Feng et al. |
| 2013/0012643 A1 | 1/2013 | Monsheimer et al. |
| 2013/0140278 A1 | 6/2013 | Bruck et al. |
| 2013/0146041 A1 | 6/2013 | Hijii et al. |
| 2013/0152739 A1 | 6/2013 | Li et al. |
| 2015/0252451 A1 | 9/2015 | Al-Aqeeli et al. |
| 2015/0337423 A1* | 11/2015 | Martin ............... B22F 3/1039 75/230 |
| 2017/0016095 A1 | 1/2017 | Karlen et al. |
| 2017/0121802 A1* | 5/2017 | Kamat ............... B62D 29/008 |
| 2017/0252851 A1 | 9/2017 | Fulop et al. |
| 2018/0304373 A1* | 10/2018 | Han ....................... B22F 7/008 |

FOREIGN PATENT DOCUMENTS

| | | | |
|---|---|---|---|
| JP | 2011054892 A | 3/2011 | |
| KR | 1020080105250 A | 12/2008 | |
| WO | 2005017220 A1 | 2/2005 | |
| WO | WO-2017069525 A1 * | 4/2017 | ............. B22F 5/009 |
| WO | WO-2018157159 A1 * | 8/2018 | ............. B33Y 70/00 |

OTHER PUBLICATIONS

Machine translation of CN-102974955-A, Apr. 2021.*
Mukherjee et al., "Printability of alloys for additive manufacturing" Scientific Reports | 6:19717 | DOI: 10.1038/srep19717, Jan. 22, 2016.
Martin et al., "3D printing of high-strength aluminium alloys" Nature, vol. 549, Sep. 21, 2017.

* cited by examiner

FEEDSTOCKS FOR ADDITIVE MANUFACTURING, AND METHODS OF USING THE SAME

PRIORITY DATA

This patent application is a continuation application of U.S. patent application Ser. No. 15/996,438, filed on Jun. 2, 2018, which claims priority to U.S. Provisional Patent App. No. 62/540,615, filed on Aug. 3, 2017, each of which is hereby incorporated by reference herein.

FIELD OF THE INVENTION

The present invention generally relates to processes for additive manufacturing using optimized metal-containing precursors (e.g., powders).

BACKGROUND OF THE INVENTION

Metal-based additive manufacturing, or three-dimensional (3D) printing, has applications in many industries, including the aerospace and automotive industries. Building up metal components layer-by-layer increases design freedom and manufacturing flexibility, thereby enabling complex geometries while eliminating traditional economy-of-scale constraints. In metal-based additive manufacturing, application of a direct energy source, such as a laser or electron beam, to melt alloy powders locally results in solidification rates between 0.1 m/s and 5 m/s, an order of magnitude increase over conventional casting processes.

Additive manufacturing allows for one-step fabrication of complex parts of arbitrary design. Additive manufacturing eliminates the need for assembling multiple components or setting up new equipment, while minimizing manufacturing time and wastage of materials and energy. Although additive manufacturing is rapidly growing to produce metallic, polymeric, and ceramic components, production of metallic parts is its fastest growing sector.

In order to successfully print a metallic part, an appropriate alloy must be selected. Successive layers need to be adequately bonded by fusion. An understanding of printability, including the ability of an alloy to resist distortion and fusion defects, is important for powder bed-based additive manufacturing processes.

Currently only a few alloys, the most relevant being AlSi10Mg, TiAl6V4, CoCr, and Inconel 718, can be reliably additively manufacturing. The vast majority of the more than 5,500 alloys in use today cannot be additively manufactured because the melting and solidification dynamics during the printing process lead to intolerable microstructures with large columnar grains and cracks. 3D-printable metal alloys are limited to those known to be easily weldable. The limitations of the currently printable alloys, especially with respect to specific strength, fatigue life, and fracture toughness, have hindered metal-based additive manufacturing. See Martin et al., "3D printing of high-strength aluminium alloys" *Nature* vol. 549, pages 365-369.

Specifically regarding aluminum alloys, for example, the only printable aluminum alloys are based on the binary Al—Si system and tend to converge around a yield strength of approximately 200 MPa with a low ductility of 4%. The exception is Scalmalloy, which relies on alloying additions of scandium, a rare high-cost metal. In contrast, most aluminum alloys used in automotive, aerospace, and consumer applications are wrought alloys of the 2000, 5000, 6000, or 7000 series, which can exhibit strengths exceeding 400 MPa and ductility of more than 10% but cannot currently be additively manufactured. These systems have low-cost alloying elements (Cu, Mg, Zn, and Si) carefully selected to produce complex strengthening phases during subsequent ageing. These same elements promote large solidification ranges, leading to hot tearing (cracking) during solidification—a problem that has been difficult to surmount for more than 100 years since the first age-hardenable alloy, duralumin, was developed.

In particular, during solidification of these alloys, the primary equilibrium phase solidifies first at a different composition from the bulk liquid. This mechanism results in solute enrichment in the liquid near the solidifying interface, locally changing the equilibrium liquidus temperature and producing an unstable, undercooled condition. As a result, there is a breakdown of the solid-liquid interface leading to cellular or dendritic grain growth with long channels of interdendritic liquid trapped between solidified regions. As temperature and liquid volume fraction decrease, volumetric solidification shrinkage and thermal contraction in these channels produces cavities and hot tearing cracks which may span the entire length of the columnar grain and can propagate through additional intergranular regions. Note that aluminum alloys Al 7075 and Al 6061 are highly susceptible to the formation of such cracks, due to a lack of processing paths to produce fine equiaxed grains.

Another problem associated with additive manufacturing of metals is that producing equiaxed structures typically requires large amounts of undercooling, which has thus far proven difficult in additive processes where high thermal gradients arise from rastering of a direct energy source in an arbitrary geometric pattern. Fine equiaxed microstructures accommodate strain in the semi-solid state by suppressing coherency that locks the orientation of these solid dendrites and promotes tearing.

Yet another problem associated with additive manufacturing of metals arises from the vapor pressures of some metals themselves. Most engineering alloys contain multiple alloying elements that vaporize rapidly at high temperatures and can be selectively lost during additive manufacturing or welding. Consequently, the chemical composition of the final part may be different from that of the original material.

In particular, at high temperatures encountered during additive manufacturing, significant vaporization of alloying elements can happen out of the melt pool. Since some alloying elements are more volatile than others, selective vaporization of alloying elements often results in a significant change in the composition of the alloy. For example, during laser welding of aluminum alloys, losses of magnesium and zinc result in pronounced changes to their concentrations. The composition change can cause degradation of mechanical properties (e.g., tensile strength) and chemical properties (e.g., corrosion resistance) in the final structure.

A reduction in peak temperature and a smaller surface-to-volume ratio of the melt pool may minimize pronounced changes of chemical composition during laser processing. However, it is not always possible to minimize temperature due to the presence of high-melting-point metals that need to be liquefied during additive manufacturing. Likewise, depending on the specific additive manufacturing set-up or three-dimensional object to be printed, it is not always possible to reduce surface-to-volume ratio of the melt pool—or even if that can be done, it may not be sufficient to prevent significant vaporization of high-vapor-pressure metals.

A lack of teaching in the art with respect to processing of alloy systems that undergo vaporization makes it very difficult to select targeted alloy feedstock compositions. Currently, metal powders and feedstocks are produced at the same composition as the desired final alloy. There is a need to provide optimized feedstocks for additive manufacturing of metals, to address this significant problem.

SUMMARY OF THE INVENTION

The present invention addresses the aforementioned needs in the art, as will now be summarized and then further described in detail below.

Some variations provide a method of making an additively manufactured metal component, the method comprising:

(a) providing a metal-containing feedstock comprising a high-vapor-pressure metal and at least one other metal species different than the high-vapor-pressure metal;

(b) exposing a first amount of the metal-containing feedstock to an energy source for melting the first amount of the metal-containing feedstock, thereby generating a first melt layer; and (c) solidifying the first melt layer, thereby generating a first solid layer of an additively manufactured metal component, wherein the metal-containing feedstock contains a higher concentration of the high-vapor-pressure metal compared to the concentration of the high-vapor-pressure metal in the first solid layer.

The high-vapor-pressure metal may be present in the metal-containing feedstock in a concentration from about 0.1 wt % to about 20 wt %, for example. The enrichment ratio of wt % concentration of the high-vapor-pressure metal in the metal-containing feedstock to wt % concentration of the high-vapor-pressure metal in the first solid layer is typically at least 1.05, such as at least 1.25, at least 1.5, or at least 2.0.

The high-vapor-pressure metal may be selected from the group consisting of Mg, Zn, Li, Al, Cd, Hg, K, Na, Rb, Cs, Mn, Be, Ca, Sr, Ba, and combinations thereof. In certain embodiments, the high-vapor-pressure metal is selected from the group consisting of Mg, Zn, Al, Li, and combinations thereof.

The metal-containing feedstock may be an aluminum alloy, a magnesium alloy, a titanium alloy, a nickel superalloy, a copper superalloy, or a combination thereof.

The metal-containing feedstock may be in the form of a powder or a geometric object, such as a wire.

In some embodiments, the metal-containing feedstock contains Al, from 0.05 wt % to 0.28 wt % Cr, from 1 wt % to 2 wt % Cu, from 3 wt % to 10 wt % Mg, and from 6.2 wt % to 20 wt % Zn; and wherein the first solid layer contains Al, from 0.18 wt % to 0.28 wt % Cr, from 1.2 wt % to 2 wt % Cu, from 2.1 wt % to 2.9 wt % Mg, and from 5.1 wt % to 6.1 wt % Zn.

In some embodiments, the metal-containing feedstock contains Al, from 0.01 wt % to 5 wt % Zr, from 1 wt % to 2.6 wt % Cu, from 2.7 wt % to 10 wt % Mg, and from 6.7 wt % to 20 wt % Zn; and wherein the first solid layer contains Al, from 0.08 wt % to 5 wt % Zr, from 2 wt % to 2.6 wt % Cu, from 1.9 wt % to 2.6 wt % Mg, and from 5.7 wt % to 6.7 wt % Zn.

In some embodiments, the metal-containing feedstock contains Al, from 0.01 wt % to 5 wt % Zr, from 1.9 wt % to 10 wt % Mg, and from 7.1 wt % to 20 wt % Zn; and wherein the first solid layer contains aluminum, from 0.07 wt % to 5 wt % Zr, from 1.3 wt % to 1.8 wt % Mg, and from 7 wt % to 8 wt % Zn.

In various embodiments, steps (b) and (c) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof.

The method may further comprise repeating steps (b) and (c) a plurality of times to generate a plurality of solid layers by sequentially solidifying a plurality of melt layers in an additive-manufacturing build direction. The first solid layer, and additional solid layers, may be characterized by an average grain size of less than 10 microns.

In some embodiments of the invention, the metal-containing feedstock further comprises grain-refining nanoparticles. The grain-refining nanoparticles may be present from about 0.001 wt % to about 10 wt % of the metal-containing feedstock, for example.

In these embodiments, the grain-refining nanoparticles are selected from the group consisting of zirconium, silver, lithium, manganese, iron, silicon, vanadium, scandium, yttrium, niobium, tantalum, titanium, nitrogen, hydrogen, carbon, boron, and combinations thereof, such as intermetallics or nitrides, hydrides, carbides, or borides of one or more of the recited metals. In certain embodiments, the grain-refining nanoparticles are selected from the group consisting of zirconium, titanium, tantalum, niobium, and oxides, nitrides, hydrides, carbides, or borides thereof, and combinations of the foregoing.

When grain-refining nanoparticles are included in the metal-containing feedstock, the additively manufactured first solid layer may have a microstructure with equiaxed grains. The additively manufactured first solid layer may also be characterized by a crack-free microstructure, in preferred embodiments.

The present invention also provides an additively manufactured metal component produced by a process comprising:

(a) providing a metal-containing feedstock comprising a high-vapor-pressure metal and at least one other metal species different than the high-vapor-pressure metal;

(b) exposing a first amount of the metal-containing feedstock to an energy source for melting the first amount of the metal-containing feedstock, thereby generating a first melt layer;

(c) solidifying the first melt layer, thereby generating a first solid layer of an additively manufactured metal component; and (d) repeating steps (b) and (c) a plurality of times to generate a plurality of solid layers by sequentially solidifying a plurality of melt layers in an additive-manufacturing build direction, wherein the metal-containing feedstock contains a higher concentration of the high-vapor-pressure metal compared to the concentration of the high-vapor-pressure metal in the solid layers.

In some embodiments, an enrichment ratio of wt % concentration of the high-vapor-pressure metal in the metal-containing feedstock to wt % concentration of the high-vapor-pressure metal in the first solid layer is at least 1.05.

In the additively manufactured metal component, the high-vapor-pressure metal may be selected from the group consisting of Mg, Zn, Li, Al, Cd, Hg, K, Na, Rb, Cs, Mn, Be, Ca, Sr, Ba, and combinations thereof.

In certain additively manufactured metal components, the metal-containing feedstock contains Al, from 0.05 wt % to 0.28 wt % Cr, from 1 wt % to 2 wt % Cu, from 3 wt % to 10 wt % Mg, and from 6.2 wt % to 20 wt % Zn; and the first solid layer contains Al, from 0.18 wt % to 0.28 wt % Cr, from 1.2 wt % to 2 wt % Cu, from 2.1 wt % to 2.9 wt % Mg, and from 5.1 wt % to 6.1 wt % Zn.

In certain additively manufactured metal components, the metal-containing feedstock contains Al, from 0.01 wt % to 5 wt % Zr, from 1 wt % to 2.6 wt % Cu, from 2.7 wt % to 10 wt % Mg, and from 6.7 wt % to 20 wt % Zn; and the first solid layer contains Al, from 0.08 wt % to 5 wt % Zr, from 2 wt % to 2.6 wt % Cu, from 1.9 wt % to 2.6 wt % Mg, and from 5.7 wt % to 6.7 wt % Zn.

In certain additively manufactured metal components, the metal-containing feedstock contains Al, from 0.01 wt % to 5 wt % Zr, from 1.9 wt % to 10 wt % Mg, and from 7.1 wt % to 20 wt % Zn; and the first solid layer contains Al, from 0.07 wt % to 5 wt % Zr, from 1.3 wt % to 1.8 wt % Mg, and from 7 wt % to 8 wt % Zn.

The additively manufactured metal component may be characterized by an average grain size of less than 1 millimeter, such as less than 10 microns.

In some embodiments, the additively manufactured metal component has a microstructure with a crystallographic texture that is not solely oriented in the additive-manufacturing build direction. The plurality of solid layers may have differing primary growth-direction angles with respect to each other.

In some embodiments, the additively manufactured metal component has a microstructure with equiaxed grains. In certain embodiments, the additively manufactured metal component has a crack-free microstructure.

Variations of the present invention also provide a metal-containing feedstock for additive manufacturing, wherein the metal-containing feedstock contains at least one high-vapor-pressure metal, and wherein concentration of the at least one high-vapor-pressure metal in the metal-containing feedstock is selected based on a desired concentration of the high-vapor-pressure metal in an additively manufactured metal component derived from the metal-containing feedstock. The concentration of the high-vapor-pressure metal will be higher (enriched) in the metal-containing feedstock, compared to the final additively manufactured metal component.

Some embodiments provide a metal-containing feedstock for additive manufacturing, containing Al, from 0.05 wt % to 0.28 wt % Cr, from 1 wt % to 2 wt % Cu, from 3 wt % to 10 wt % Mg, and from 6.2 wt % to 20 wt % Zn.

Other embodiments of the invention provide a metal-containing feedstock for additive manufacturing, wherein the metal-containing feedstock contains Al, from 0.01 wt % to 5 wt % Zr, from 1.9 wt % to 10 wt % Mg, and from 6.7 wt % to 20 wt % Zn. In some embodiments, the metal-containing feedstock further contains from 1 wt % to 2.6 wt % Cu.

DETAILED DESCRIPTION OF EMBODIMENTS OF THE INVENTION

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Figure 1:
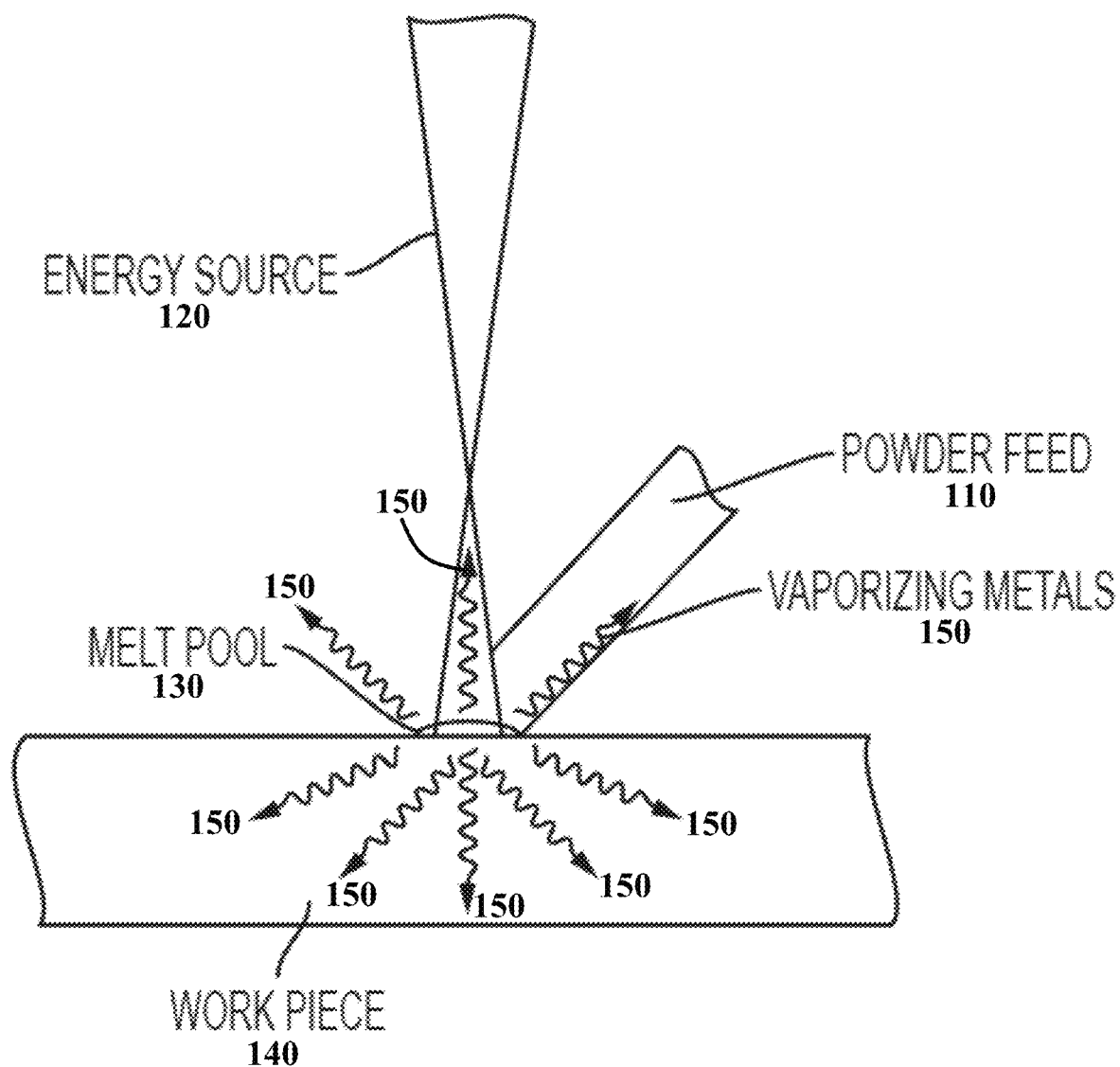
FIG. 1 is a schematic illustration of the vaporization of high-vapor-pressure metals during additive manufacturing, in some embodiments.

During additive manufacturing of metals, a direct energy source locally melts metal or metal alloy feedstocks and builds up a part, layer by layer. During this process, intense heating can vaporize high-vapor-pressure metals, depending on temperatures and mass-transport pathways. A simple illustration is shown in FIG. 1, described below. Vaporization of metals from the melt pool results in a material that, after solidification, is a different composition compared to the starting feedstock. In many cases, this means that the resulting structure is no longer the correct composition. As used herein, "melt pool" refers to a volume of molten metal that is formed during additive manufacturing or welding.

Variations of the present invention are premised on providing a feedstock with enriched high-vapor-pressure metals, so that the final additively manufactured structure contains a targeted composition. The targeted composition, which differs from the feedstock composition, is very important to the final material properties.

For example, during additive manufacturing of aluminum alloy Al 7075 powders, about 30% of the magnesium and about 25% of the zinc can be lost during the additive manufacturing process. These elements have high vapor pressures in the melt pool, which can reach temperatures exceeding 1000° C. At these temperatures, the vapor pressure of Mg and Zn are much higher than 1 kPa—specifically, about 40 kPa for Mg and over 100 kPa for Zn (1 kPa=0.01 bar). Other elements in the alloy, such as copper and chromium, are relatively unchanged due to their negligible vapor pressures at additive manufacturing temperatures. These low-vapor-pressure metals have minor concentration enrichment from the associated mass loss of the high-vapor-pressure elements.

Heretofore, there are no available aluminum alloy feedstocks containing high levels of high-vapor-pressure elements such as Mg, Zn, and Li, that will result in an additively manufactured structure of identical composition to the original powder. Variations of this invention enable the production of additively manufactured high-strength metal alloys with targeted compositions that contain high-vapor-pressure elements.

Some variations provide a method of making an additively manufactured metal component, the method comprising:

(a) providing a metal-containing feedstock comprising a high-vapor-pressure metal and at least one other metal species different than the high-vapor-pressure metal;

(b) exposing a first amount of the metal-containing feedstock to an energy source for melting the first amount of the metal-containing feedstock, thereby generating a first melt layer; and (c) solidifying the first melt layer, thereby generating a first solid layer of an additively manufactured metal component, wherein the metal-containing feedstock contains a higher concentration of the high-vapor-pressure metal compared to the concentration of the high-vapor-pressure metal in the first solid layer.

Steps (b) and (c) may be repeated a plurality of times to generate a plurality of solid layers by sequentially solidifying a plurality of melt layers in an additive-manufacturing build direction.

In this disclosure, a "metal-containing feedstock" is any metal-containing powder, wire, sheet, or other geometric object of any compatible size that can be utilized in additive manufacturing or welding processes. The additive manufacturing or welding processes may employ conventional equipment or customized apparatus suitable for carrying out the methods taught herein to produce an additively manufactured or welded metal component. By "component" it is meant any object that is produced by additive manufacturing, 3D printing, or welding.

A simple illustration is shown in FIG. 1. In the schematic of FIG. 1, a metal-containing powder feed 110 is exposed to an energy source 120, melting the powder to form a melt pool 130. Solidification of the melt pool results in a work piece 140, which may contain one or more individual layers of solidified metal-containing feedstock. High-vapor-pressure metals 150 may vaporize from the melt pool 140, as depicted by the serpentine arrows of FIG. 1. The energy source 120 and/or the work piece 140 may be moved in a prescribed pattern to build the desired work piece 140. In some embodiments, a wire feed is employed, rather than a powder feed. In other embodiments, a powder bed is employed, in which the energy source melts metal-containing powder that is disposed as a layer on the work piece 140. In any of these scenarios, a melt pool 130 forms, from which high-vapor-pressure metals 140 may be vaporized and released to a space outside of the work area. Note that the serpentine arrows showing vaporizing metals 150 are intended to be outside of the work piece 140, not within it. Notwithstanding the foregoing, some vaporizing metal atoms may penetrate through the solidifying work piece 140 or may be temporarily contained within vapor-containing porous regions of the work piece 140, before being released out of the system of FIG. 1.

The metal-containing feedstock includes a base metal (such as, but not limited to, aluminum) and one or more additional elements, to form a metal alloy. In various embodiments, at least one additional element, or a plurality of additional elements, is present in a concentration from about 0.01 wt % to about 20 wt %, such as about 0.1, 0.5, 1.0, 1.5, 2, 3, 4, 5, 6, 7, 8, 9, 10, 11, 12, 13, 14, or 15 wt %. In this disclosure, at least one of the additional elements is a high-vapor-pressure metal.

In some embodiments, one or more metals are selected from the group consisting of aluminum, iron, nickel, copper, titanium, magnesium, zinc, silicon, lithium, silver, chromium, manganese, vanadium, bismuth, gallium, lead, and combinations thereof. The metal-containing feedstock may contain one or more alloying elements selected from the group consisting of Al, Si, Fe, Cu, Ni, Mn, Mg, Cr, Zn, V, Ti, Bi, Ga, Pb, or Zr. Other alloying elements may be included in the metal-containing feedstock, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These other alloying elements may function as grain refiners, as strength enhancers, as stability enhancers, or a combination thereof.

The high-vapor-pressure metal, or a combination of high-vapor-pressure metals, may be present in the metal-containing feedstock in a concentration from about 0.1 wt % to about 20 wt %, for example. In various embodiments, the high-vapor-pressure metal, or a combination of high-vapor-pressure metals, may be present in the metal-containing feedstock in a concentration of about 0.5, 1, 2, 3, 4, 5, 6, 7, 8, 9, 10 wt %, or higher. When multiple high-vapor-pressure metals are present, the individual high-vapor-pressure metals may each be present in the metal-containing feedstock in a concentration of about 0.1, 0.5, 1, 2, 3, 4, 5, 6, 7, 8, 9, 10 wt %, or higher.

A "high-vapor-pressure metal" as meant herein includes a metal that has a vapor pressure of 1 kPa or greater at a melt-pool temperature. A "high-vapor-pressure metal" also includes a metal for which at least 1% by mass is lost to a vapor phase or the atmosphere from a multicomponent solution, at a melt-pool temperature, during an additive manufacturing or welding process.

A "melt-pool temperature" refers to a temperature that characterizes a melt pool, which temperature may be a melt-pool volume-average temperature, a melt-pool time-average temperature, a melt-pool surface temperature, or a melt-pool peak temperature (the highest temperature reached by any surface or region within the melt pool). For a melt-pool time-average temperature, the time is the time span for the creation and solidification of a melt pool in an additive manufacturing or welding process. A melt-pool temperature may also be an overall average temperature, averaged over both space and time.

A melt-pool temperature will vary depending at least on the specific metals to be melted, the power intensity applied to the melt pool, and the geometry of the melt pool. A melt-pool temperature may vary from about 800° C. to about 2000° C., such as about, or at least about, 900° C., 1000° C., 1100° C., 1200° C., 1300° C., 1400° C., 1500° C., 1600° C., 1700° C., 1800° C., or 1900° C., for example, noting that these temperatures may be volume-average temperatures, time-average temperatures, surface temperatures, and/or peak temperatures of the melt pool. In various embodiments, a selected high-vapor-pressure metal has a vapor pressure of 1 kPa or greater at 1000° C., 1100° C., 1200° C., 1300° C., 1400° C., 1500° C., 1600° C., 1700° C., or 1800° C.

In some embodiments, a selected high-vapor-pressure metal has a vapor pressure of 5 kPa, 10 kPa, 20 kPa, 30 kPa, 40 kPa, 50 kPa, 60 kPa, 70 kPa, 80 kPa, 90 kPa, 100 kPa or greater at a melt-pool temperature. In some embodiments, a selected high-vapor-pressure metal has a vapor pressure of 1 kPa or greater at a temperature less than a melt-pool temperature, such as about 100° C., 200° C., 300° C., 400° C., or 500° C. less than the melt-pool temperature.

The high-vapor-pressure metal may be selected from the group consisting of Mg, Zn, Li, Al, Cd, Hg, K, Na, Rb, Cs, Mn, Be, Ca, Sr, Ba, and combinations thereof. In certain embodiments, the high-vapor-pressure metal is selected from the group consisting of Mg, Zn, Al, Li, and combinations thereof.

Aluminum at 1000° C. has a single-component vapor pressure of about $3 \times 10^{-5}$ kPa but is experimentally observed to be volatile during additive manufacturing. Even when average melt-pool temperatures are around 1000° C., local hot spots are believed to reach at least 1700° C., at which the vapor pressure of Al exceeds 1 kPa. Therefore, Al is a high-vapor-pressure metal, in some embodiments.

The other metal species different than the high-vapor-pressure metal may be classified as a low-vapor-pressure metal, such as (but not limited to) transition metals. Exemplary low-vapor-pressure metals include Cu, Ni, Cr, W, and Mo. A "low-vapor-pressure metal" as meant herein is a metal that has a vapor pressure less than 1 kPa at a melt-pool temperature. The vapor pressure of a selected low-vapor-pressure metal may be significantly lower than 1 kPa, such as about $10^{-3}$ kPa, $10^{-4}$ kPa, $10^{-5}$ kPa, $10^{-6}$ kPa, $10^{-7}$ kPa, $10^{-8}$ kPa, $10^{-9}$ kPa, or $10^{-10}$ kPa, or lower, at a melt-pool temperature.

Note that for some metals with vapor pressures below 1 kPa at a melt-pool temperature, those metals may nevertheless be lost to a significant extent from the solid component as it is being formed during additive manufacturing or welding. This can occur for several reasons. First, non-ideal multicomponent solution thermodynamics may cause a metal to vaporize at a temperature different than its pure (single-component) vaporization temperature for a given pressure. Second, the specific atmosphere (e.g., presence of inert gases or reactive gases) above the metal solution may alter the vaporization thermodynamics. Third, localized hot spots can occur during additive manufacturing or welding, causing localized regions of higher vapor pressure for a metal. Finally, in some cases a metal may be entrained or otherwise carried into a vapor phase despite being nominally a solid at the given temperature and pressure. A metal that transports into a vapor phase for any reason is considered to be vaporized, in this disclosure.

Generally, the specific extents of metal vaporization are dictated by the original (feedstock) composition and the associated solvation energies keeping the alloying elements in solution. These extents of metal vaporization can be experimentally determined and/or predicted by calculations or simulations. With that information, alloy systems can be optimized to accommodate the expected mass loss of the high-vapor-pressure elements.

In some embodiments, simulations are employed to estimate extents of metal vaporization in complex multicomponent metal solutions. These simulations may account for variations in temperatures, laser power intensity, pressures and pressure gradients, time, mass-transport pathways and concentration gradients, heat transfer (by conduction, convection, and radiation), 3D geometry, surface tension, buoyancy forces, and/or diluent gases, among other potential factors.

The simulations may be configured to predict both formal vaporization of metals as well as entrainment, such as ejection of tiny metal droplets owing to the recoil force exerted by metal vapors. These simulations may include calculations to solve for the temperature and velocity fields during additive manufacturing or welding, using a transient, heat transfer and fluid flow model based on the solution of the equations of conservation of mass, momentum, and energy in the melt pool. Simulation software may be utilized, such as ANSYS Fluent (Canonsburg, Pa., US), to assist in the calculations. Fuerschbach et al., "Understanding Metal Vaporization from Laser Welding" Sandia National Laboratories Report No. SAND2003-3490, 2003, is hereby incorporated by reference herein for its exemplary teachings of theoretical considerations in simulating extents of metal vaporization in embodiments herein.

The specific extents of metal vaporization may alternatively, or additionally, be determined experimentally. For example, in the case of additive manufacturing of aluminum alloy Al 7075 powders, it has been experimentally found that, under certain conditions, about 25% of zinc and about 30% of magnesium are lost during fabrication of the 3D-printed component. This information can be utilized in future additive manufacturing processes and simulations for Al 7075 alloys.

The enrichment ratio of wt % concentration of the high-vapor-pressure metal in the metal-containing feedstock to wt % concentration of the high-vapor-pressure metal in the first solid layer is typically at least 1.05, such as at least 1.25, at least 1.5, or at least 2.0. When multiple layers are produced, the enrichment ratio of wt % concentration of the high-vapor-pressure metal in the metal-containing feedstock to wt % concentration of the high-vapor-pressure metal in each additional solid layer is typically at least 1.05, such as at least 1.25, at least 1.5, or at least 2.0. In various embodiments, the enrichment ratio of a certain high-vapor-pressure metal, in one or more solid layers, is about, or at least about, 1.01, 1.02, 1.05, 1.1, 1.15, 1.2, 1.25, 1.3, 1.35, 1.4, 1.45, 1.5, 1.6, 1.7, 1.8, 1.9, 2.0, 2.1, 2.2, 2.3, 2.4, 2.5, 2.6, 2.7, 2.8, 2.9, or 3.0. The enrichment ratios of individual elements will generally be different due to differences in properties of elements. Elements with higher vapor pressures will tend to have higher enrichment ratios.

The enrichment ratios for a given element may be about the same in all solid layers, when additive manufacturing conditions remain constant in the build direction. In some embodiments, the enrichment ratios for a given element may vary by build layer, such as when local temperature, heating/cooling profile, pressure, or gas atmosphere varies at least to some extent in the additive manufacturing build direction.

In some embodiments, the metal-containing feedstock contains from 0.05 wt % to 0.28 wt % Cr, from 1 wt % to 2 wt % Cu, from 3 wt % to 10 wt % Mg, and from 6.2 wt % to 20 wt % Zn; and wherein the first solid layer contains from 0.18 wt % to 0.28 wt % Cr, from 1.2 wt % to 2 wt % Cu, from 2.1 wt % to 2.9 wt % Mg, and from 5.1 wt % to 6.1 wt % Zn. The enrichment ratios of Cr, Cu, Mg, and/or Zn may vary, such as at least 1.05, at least 1.25, at least 1.5, or at least 2.0, noting that the enrichment ratios of individual elements will generally be different due to differences in properties of elements.

In some embodiments, the metal-containing feedstock contains from 0.01 wt % to 5 wt % Zr, from 1 wt % to 2.6 wt % Cu, from 2.7 wt % to 10 wt % Mg, and from 6.7 wt % to 20 wt % Zn; and wherein the first solid layer contains from 0.08 wt % to 5 wt % Zr, from 2 wt % to 2.6 wt % Cu, from 1.9 wt % to 2.6 wt % Mg, and from 5.7 wt % to 6.7 wt % Zn. The enrichment ratios of Zr, Cu, Mg, and/or Zn may vary, such as at least 1.05, at least 1.25, at least 1.5, or at least 2.0, for example.

In some embodiments, the metal-containing feedstock contains from 0.01 wt % to 5 wt % Zr, from 1.9 wt % to 10 wt % Mg, and from 7.1 wt % to 20 wt % Zn; and wherein the first solid layer contains from 0.07 wt % to 5 wt % Zr, from 1.3 wt % to 1.8 wt % Mg, and from 7 wt % to 8 wt % Zn. The enrichment ratios of Zr, Mg, and/or Zn may vary, such as at least 1.05, at least 1.25, at least 1.5, or at least 2.0, for example.

Figure 3:
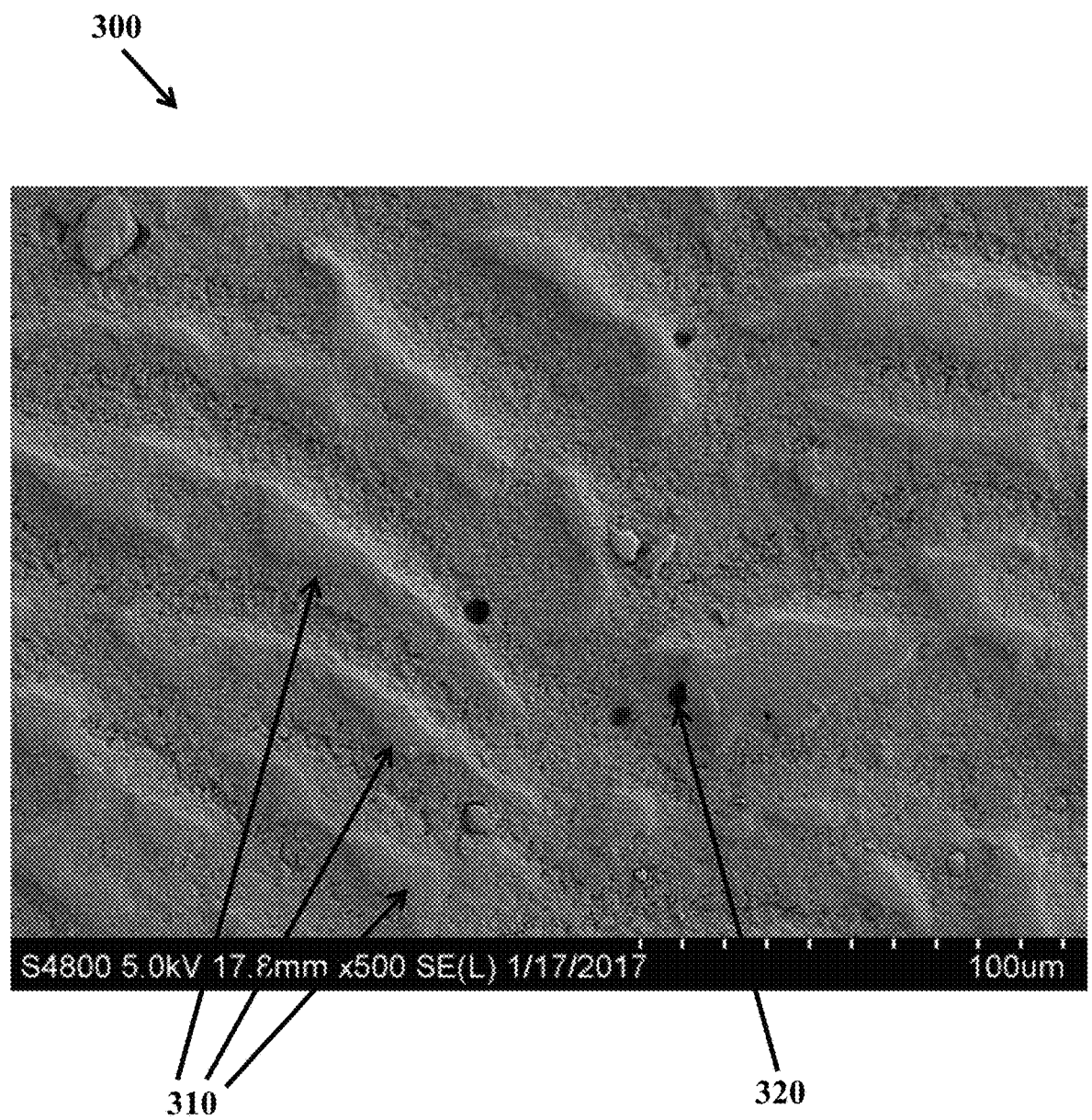
FIG. 3 shows an SEM image of additively manufactured, grain-refined aluminum alloy Al 6061 with Zr particles, revealing fine equiaxed grains and a substantially crack-free microstructure, in some embodiments.

The metal-containing feedstock, the final component, or both of these may be characterized as an aluminum alloy (e.g., from the 6000 series or 7000 series of Al alloys), a magnesium alloy, a titanium alloy, a nickel superalloy, a copper superalloy, or a combination thereof. FIG. 3 depicts an exemplary microstructure 300 for additively manufactured components containing aluminum alloy Al 6061, for example. FIG. 3 shows an SEM image of additively manufactured, grain-refined aluminum alloy Al 6061 with Zr particles (not individually visible in FIG. 3), revealing fine equiaxed grains 310 and a substantially crack-free microstructure 300 containing a few porous voids 320, in some embodiments.

A "superalloy" is an alloy that exhibits excellent mechanical strength, resistance to thermal creep deformation, good surface stability, and resistance to corrosion or oxidation. Examples of superalloys include Hastelloy, Inconel, Waspaloy, and Incoloy. Some superalloys have a γ' (gamma prime) phase, which is an intermetallic precipitate to strengthen the superalloy. For example, in Ni-based superalloys, a γ'-$Ni_3Al/Ni_3Ti$ phase acts as a barrier to dislocation motion. This γ' intermetallic phase, when present in high volume fractions, drastically increases the strength of these alloys due to the ordered nature and high coherency of the γ' intermetallic phase with the continuous matrix.

In some embodiments, aluminum is present in the metal-containing feedstock in a concentration from about 0.1 wt % to about 90 wt %. In some embodiments, copper is present in the metal-containing feedstock in a concentration from about 0.1 wt % to about 90 wt %. In these or other embodiments, magnesium is present in the metal-containing feedstock in a concentration from about 0.1 wt % to about 90 wt %. In these or other embodiments, at least one of zinc or silicon is present in the metal-containing feedstock in a concentration from about 0.1 wt % to about 90 wt %. In some embodiments, the metal-containing feedstock further comprises chromium. In some embodiments, scandium is not present in the metal-containing feedstock.

In general, the geometry of the metal-containing feedstock is not limited and may be, for example, in the form of powder particles, wires, rods, bars, plates, films, coils, spheres, cubes, prisms, cones, irregular shapes, or combinations thereof. In certain embodiments, the metal-containing feedstock is in the form of a powder, a wire, or a combination thereof (e.g., a wire with powder on the surface). When the metal-containing feedstock is in the form of powder, the powder particles may have an average diameter from about 1 micron to about 500 microns, such as about 10 microns to about 100 microns, for example. When the metal-containing feedstock is in the form of a wire, the wire may have an average diameter from about 10 microns to about 1000 microns, such as about 50 microns to about 500 microns, for example.

The energy source in step (b) may be provided by a laser beam, an electron beam, alternating current, direct current, plasma energy, induction heating from an applied magnetic field, ultrasonic energy, other sources, or a combination thereof. Typically, the energy source is a laser beam or an electron beam.

In various embodiments, steps (b) and (c) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof.

In certain embodiments, the additive manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber can be fully purged between build cycles, allowing for lower oxygen concentrations and reduced gas leakage.

Electron beam melting uses a heated powder bed of metal that is then melted and formed layer by layer, in a vacuum, using an electron beam energy source similar to that of an electron microscope. Metal powder is welded together, layer by layer, under vacuum.

Laser engineering net shaping is a powder-injected technique operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons.

Herderick, "Additive Manufacturing of Metals: A Review," *Proceedings of Materials Science and Technology* 2011, Additive Manufacturing of Metals, Columbus, Ohio, 2011, is hereby incorporated by reference herein for its teaching of various additive manufacturing techniques.

Figure 2:
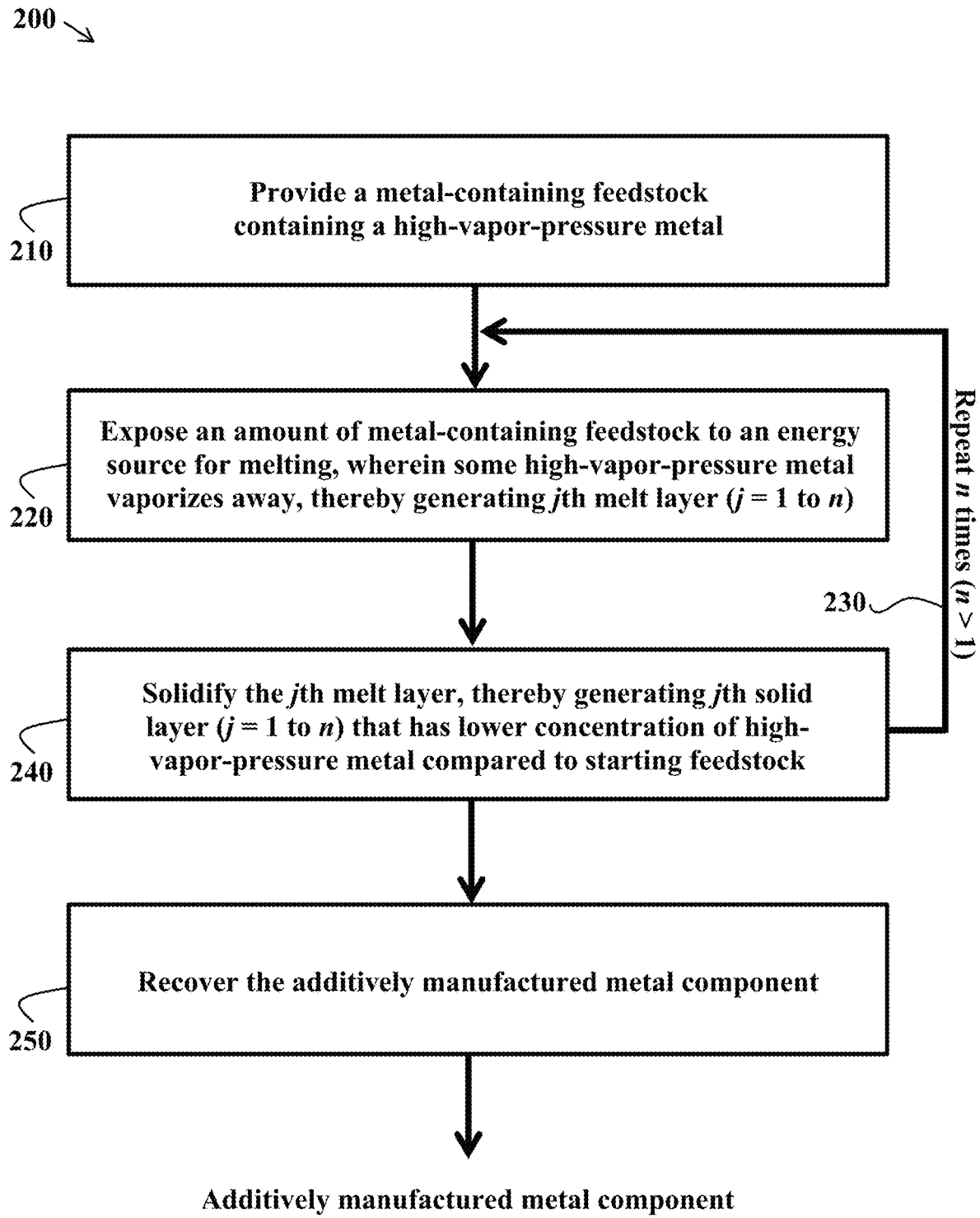
FIG. 2 is an exemplary method flowchart for producing an additively manufactured metal component, in some embodiments.

FIG. 2 is a flowchart for an exemplary process 200 for producing an additively manufactured metal component, in some embodiments. In step 210, a metal-containing feedstock containing a high-vapor-pressure metal is provided. In step 220, an amount of metal-containing feedstock is exposed to an energy source for melting, thereby generating a jth melt layer (j=1 to n; n>1). In step 220, a fraction of high-vapor-pressure metal, or multiple high-vapor-pressure metals, vaporizes away. In step 240, the jth melt layer is solidified, thereby generating a jth solid layer. Steps 220 and 240 each are repeated n times (repeat loop 230), where n is an integer that is at least 2, to produce n individual solid layers. Step 250 recovers the additively manufactured metal component which contains n solid layers.

The process 200 is not limited in principle to the number of solid layers that may be fabricated. A "plurality of solid layers" (n in FIG. 2) means at least 2 layers, such as at least 10 individual solid layers in the additively manufactured, nanofunctionalized metal alloy. The number of solid layers may be much greater than 10, such as about 100, 1000, 10000, or more. The plurality of solid layers may be characterized by an average layer thickness of at least 10 microns, such as about 10, 20, 30, 40, 50, 75, 100, 150, or 200 microns.

The first solid layer, and additional solid layers, may be characterized by an average grain size of less than 1 millimeter, less than 100 microns, less than 10 microns, or less than 1 micron. In various embodiments, the additively manufactured metal component, or layers within it, may be characterized by an average grain size of about, or less than about, 500 microns, 400 microns, 300 microns, 200 microns, 100 microns, 50 microns, 25 microns, 10 microns, 5 microns, 2 microns, 1 micron, 0.5 microns, 0.2 microns, or 0.1 microns.

In any of these additive manufacturing techniques, post-production processes such as heat treatment, light machining, surface finishing, coloring, stamping, or other finishing operations may be applied. Also, several additive manufactured parts may be joined together chemically or physically to produce a final object.

Metal alloy systems that utilize grain refiners give a unique microstructure for the additively manufactured metal component. The grain refiners may be designed with specific compositions for a given metal alloy, taking into account the metal vapor pressures according to the principles taught herein.

In some embodiments of the invention, the metal-containing feedstock further comprises grain-refining nanoparticles. The grain-refining nanoparticles may be present from about 0.001 wt % to about 10 wt % of the metal-containing feedstock, for example. In various embodiments, the grain-refining nanoparticles are present at a concentration of about 0.01 wt %, 0.1 wt %, 1 wt %, or 5 wt % of the metal-containing feedstock.

Nanoparticles are particles with the largest dimension between about 1 nm and about 5000 nm. A preferred size of nanoparticles is about 2000 nm or less, about 1500 nm or less, or about 1000 nm or less. In some embodiments, nanoparticles are at least 50 nm in size.

In these embodiments, the grain-refining nanoparticles are selected from the group consisting of zirconium, silver, lithium, manganese, iron, silicon, vanadium, scandium, yttrium, niobium, tantalum, titanium, nitrogen, hydrogen, carbon, boron, and combinations thereof, such as intermetallics or nitrides, hydrides, carbides, or borides of one or more of the recited metals. In certain embodiments, the grain-refining nanoparticles are selected from the group consisting of zirconium, titanium, tantalum, niobium, and oxides, nitrides, hydrides, carbides, or borides thereof, and combinations of the foregoing.

Grain-refining nanoparticles, in certain embodiments, are selected from the group consisting of $Al_3Zr$, $Al_3Ta$, $Al_3Nb$, $Al_3Ti$, $TiB$, $TiB_2$, $WC$, $AlB$, and combinations thereof. These multicomponent nanoparticles may be in place of, or in addition to, elemental forms such as zirconium, tantalum, niobium, titanium, or oxides, nitrides, hydrides, carbides, or borides thereof.

In some embodiments, micropowders are functionalized with assembled nanoparticles that are lattice-matched to a primary or secondary solidifying phase in the parent material, or that may react with elements in the micropowder to form a lattice-matched phase to a primary or secondary solidifying phase in the parent material. In certain embodiments, mixtures of assembled nanoparticles may react with each other or in some fashion with the parent material, to form a lattice-matched material having the same or similar function. For example, alloy powder feedstock particles may be mixed with lattice-matched nanoparticles that heterogeneously nucleate the primary equilibrium phases during cooling of the melt pool. The same concept may be applied to nanofunctionalized metal precursors besides powders (e.g., wires).

In some embodiments, the grain-refining nanoparticles are lattice-matched to within ±5% compared to an otherwise-equivalent metal alloy containing the one or more metals but not the grain-refining nanoparticles. In certain embodiments, the grain-refining nanoparticles are lattice-matched to within ±2% or within ±0.5% compared to a metal alloy containing the one or more metals but not the grain-refining nanoparticles.

In some embodiments, the metal-containing feedstock contains microparticles that are surface-functionalized with grain-refining nanoparticles, which may or may not include high-vapor-pressure metals. Surface functionalization may be in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underlying materials, the method of coating, reaction conditions, etc.

Nanoparticles may be attached to particles using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Methods of producing nanofunctionalized metals are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein. These disclosures relate to methods of coating certain materials onto micropowders, in some embodiments.

When grain-refining nanoparticles are included in the metal-containing feedstock, the additively manufactured solid layers may have a microstructure with equiaxed grains. The additively manufactured solid layers may also be characterized by a crack-free microstructure, in preferred embodiments (e.g., see FIG. 3B). When there are multiple solid layers, as is typical, some (but not necessarily all) of the solid layers may be characterized by an equiaxed-grain microstructure and/or a crack-free microstructure.

A microstructure that has "equiaxed grains" means that at least 90 vol %, preferably at least 95 vol %, and more preferably at least 99 vol % of the metal alloy contains grains that are roughly equal in length, width, and height. In preferred embodiments, at least 99 vol % of the microstructure contains grains that are characterized in that there is less than 25%, preferably less than 10%, and more preferably less than 5% standard deviation in each of average grain length, average grain width, and average grain height. Crystals of metal alloy form grains in the solid. Each grain is a distinct crystal with its own orientation. The areas between grains are known as grain boundaries. Within each grain, the individual atoms form a crystalline lattice. In this disclosure, equiaxed grains may result when there are many nucleation sites arising from grain-refining nanoparticles contained initially in the metal-containing feedstock.

By providing a high density of low-energy-barrier heterogeneous nucleation sites ahead of the solidification front, the critical amount of undercooling needed to induce equiaxed growth is decreased. This allows for a fine equiaxed grain structure that accommodates strain and prevents cracking under otherwise identical solidification conditions. Additive manufacturing of previously unattainable high-performance alloys, such as Al 7075 or Al 6061, is made possible with improved properties over currently available systems.

Preferably, the microstructure of the additively manufactured metal component is substantially crack-free. In certain embodiments, the microstructure is also substantially free of porous void defects.

A microstructure that is "substantially crack-free" means that at least 99.9 vol % of the metal component or layer contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions. Note that these inclusions are different than the nanoparticle inclusions that are desirable for grain refining.

The metal component microstructure may be substantially free of porous defects, in addition to being substantially crack-free. "Substantially free of porous defects" means at least 99 vol % of the additively manufactured metal component contains no porous voids having an effective diameter of at least 1 micron.

Porous defects may be in the form of porous voids. Typically, a porous void contains open space, which may be vacuum or may contain a gas such as air, $CO_2$, $N_2$, and/or Ar. Preferably, at least 80 vol %, more preferably at least 90 vol %, even more preferably at least 95 vol %, and most preferably at least 99 vol % of the additively manufactured metal component contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the additively manufactured metal component contains no larger porous voids having an effective diameter of at least 5 microns. For example, see the microstructure of FIG. 3B which contains porous voids (but contains no cracks).

The present invention also provides an additively manufactured metal component produced by a process comprising:

(a) providing a metal-containing feedstock comprising a high-vapor-pressure metal and at least one other metal species different than the high-vapor-pressure metal;

(b) exposing a first amount of the metal-containing feedstock to an energy source for melting the first amount of the metal-containing feedstock, thereby generating a first melt layer;

(c) solidifying the first melt layer, thereby generating a first solid layer of an additively manufactured metal component; and (d) repeating steps (b) and (c) a plurality of times to generate a plurality of solid layers by sequentially solidifying a plurality of melt layers in an additive-manufacturing build direction, wherein the metal-containing feedstock contains a higher concentration of the high-vapor-pressure metal compared to the concentration of the high-vapor-pressure metal in the solid layers.

In some embodiments, an enrichment ratio of wt % concentration of the high-vapor-pressure metal in the metal-containing feedstock to wt % concentration of the high-vapor-pressure metal in the first solid layer is at least 1.05, at least 1.25, at least 1.5, or at least 2.0.

In the additively manufactured metal component, the high-vapor-pressure metal may be selected from the group consisting of Mg, Zn, Li, Al, Cd, Hg, K, Na, Rb, Cs, Mn, Be, Ca, Sr, Ba, and combinations thereof.

In certain additively manufactured aluminum components, the metal-containing feedstock contained Al, from 0.05 wt % to 0.28 wt % Cr, from 1 wt % to 2 wt % Cu, from 3 wt % to 10 wt % Mg, and from 6.2 wt % to 20 wt % Zn; and the first solid layer and/or additional solid layers contain(s) Al, from 0.18 wt % to 0.28 wt % Cr, from 1.2 wt % to 2 wt % Cu, from 2.1 wt % to 2.9 wt % Mg, and from 5.1 wt % to 6.1 wt % Zn.

In certain additively manufactured aluminum components, the metal-containing feedstock contained Al, from 0.01 wt % to 5 wt % Zr, from 1 wt % to 2.6 wt % Cu, from 2.7 wt % to 10 wt % Mg, and from 6.7 wt % to 20 wt % Zn; and the first solid layer and/or additional solid layers contain(s) Al, from 0.08 wt % to 5 wt % Zr, from 2 wt % to 2.6 wt % Cu, from 1.9 wt % to 2.6 wt % Mg, and from 5.7 wt % to 6.7 wt % Zn.

In certain additively manufactured aluminum components, the metal-containing feedstock contained Al, from 0.01 wt % to 5 wt % Zr, from 1.9 wt % to 10 wt % Mg, and from 7.1 wt % to 20 wt % Zn; and the first solid layer and/or additional solid layers contain(s) Al, from 0.07 wt % to 5 wt % Zr, from 1.3 wt % to 1.8 wt % Mg, and from 7 wt % to 8 wt % Zn.

The additively manufactured metal component may be characterized by an average grain size of less than 1 millimeter, such as less than 100 microns, less than 10 microns, or less than 1 micron.

In some embodiments, the additively manufactured metal component has a microstructure with a crystallographic texture that is not solely oriented in the additive-manufacturing build direction. The plurality of solid layers may have differing primary growth-direction angles with respect to each other.

In some embodiments, the additively manufactured metal component has a microstructure with equiaxed grains. In some embodiments, the additively manufactured metal component has a crack-free microstructure. In certain embodiments, the additively manufactured metal component has a crack-free microstructure with equiaxed grains.

Variations of the present invention also provide a metal-containing feedstock for additive manufacturing or for welding, wherein the metal-containing feedstock contains at least one high-vapor-pressure metal, and wherein concentration of the high-vapor-pressure metal(s) in the metal-containing feedstock is selected based on a desired concentration of the high-vapor-pressure metal in an additively manufactured metal component derived from the metal-containing feedstock. The concentration of the high-vapor-pressure metal will be higher (enriched) in the metal-containing feedstock, compared to the final additively manufactured or welded metal component. The enrichment ratio of wt % concentration of the high-vapor-pressure metal in the metal-containing feedstock to wt % concentration of the high-vapor-pressure metal in the final additively manufactured or welded metal component is typically at least 1.05, such as at least 1.25, at least 1.5, or at least 2.0.

Some embodiments provide a metal-containing feedstock for additive manufacturing or welding of an aluminum component, containing from 0.05 wt % to 0.28 wt % Cr, from 1 wt % to 2 wt % Cu, from 3 wt % to 10 wt % Mg, and from 6.2 wt % to 20 wt % Zn, with the balance consisting essentially of aluminum. Other elements may be present, such as (but not limited to) Zr, Ag, Li, Mn, Fe, Si, V, Sc, Y, Nb, Ta, Ti, B, H, C, and/or N.

Other embodiments of the invention provide a metal-containing feedstock for additive manufacturing or welding of an aluminum component, wherein the metal-containing feedstock contains from 0.01 wt % to 5 wt % Zr, from 1.9 wt % to 10 wt % Mg (such as from 2.7 wt % to 10 wt % Mg), and from 6.7 wt % to 20 wt % Zn (such as from 7.1 wt % to 20 wt % Zn), with the balance consisting essentially of aluminum. In some embodiments, the metal-containing feedstock further contains from 1 wt % to 2.6 wt % Cu. Other elements may be present, such as (but not limited to) Cr, Cu, Ag, Li, Mn, Fe, Si, V, Sc, Y, Nb, Ta, Ti, B, H, C, and/or N.

The materials and methods disclosed herein may be applied to additive manufacturing as well as joining techniques, such as welding. Certain unweldable metals, such as high-strength aluminum alloys (e.g., aluminum alloys Al 7075, Al 7050, or Al 2199) would be excellent candidates for additive manufacturing but normally suffer from hot cracking. The principles disclosed herein allow these alloys, and many others, to be processed with significantly reduced cracking tendency.

Certain embodiments relate specifically to additive manufacturing of aluminum alloys. Additive manufacturing has been previously limited to weldable or castable alloys of aluminum. This disclosure enables additive manufacturing of a variety of high-strength and unweldable aluminum alloys by utilizing grain refinement to induce equiaxed microstructures which can eliminate hot cracking during processing. Potential applications include improved tooling, replacement of steel or titanium components at lower weight, full topological optimization of aluminum components, low-cost replacement for out-of-production components, and replacement of existing additively manufactured aluminum systems.

Some embodiments of the present invention utilize materials, methods, and principles described in commonly owned U.S. patent application Ser. No. 15/209,903, filed Jul. 14, 2016, U.S. patent application Ser. No. 15/808,872, filed Nov. 9, 2017, U.S. patent application Ser. No. 15/808,877, filed Nov. 9, 2017, and/or U.S. patent application Ser. No. 15/808,878, filed Nov. 9, 2017, each of which is hereby incorporated by reference herein. For example, certain embodiments utilize functionalized powder feedstocks as described in U.S. patent application Ser. No. 15/209,903. The present disclosure is not limited to those functionalized powders. This specification also hereby incorporates by reference herein Martin et al., "3D printing of high-strength aluminium alloys," *Nature* vol. 549, pages 365-369 and supplemental online content (extended data), Sep. 21, 2017, in its entirety.

Some variations provide a method of making a welded metal component, the method comprising:

(a) providing a metal-containing feedstock comprising a high-vapor-pressure metal and at least one other metal species different than the high-vapor-pressure metal;

(b) exposing an amount of the metal-containing feedstock to an energy source for melting the amount of the metal-containing feedstock, thereby generating a melt layer; and (c) solidifying the melt layer, thereby generating a solid layer of a welded metal component, wherein the metal-containing feedstock contains a higher concentration of the high-vapor-pressure metal compared to the concentration of the high-vapor-pressure metal in the solid layer.

Some variations also provide a welded metal component produced by a process comprising:

(a) providing a metal-containing feedstock comprising a high-vapor-pressure metal and at least one other metal species different than the high-vapor-pressure metal;

(b) exposing an amount of the metal-containing feedstock to an energy source for melting the amount of the metal-containing feedstock, thereby generating a melt layer; and (c) solidifying the melt layer, thereby generating a solid layer of a welded metal component;

wherein the metal-containing feedstock contains a higher concentration of the high-vapor-pressure metal compared to the concentration of the high-vapor-pressure metal in the solid layer.

The final additively manufactured component may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

The final additively manufactured or welded component may be selected from the group consisting of a structure, a coating, a geometric object, a billet, an ingot (which may be a green body or a finished body), a net-shape part, a near-net-shape part, a welding filler, and combinations thereof. Essentially, the geometry of an additive manufacturing part is unlimited.

In some embodiments, the additively manufactured or welded component has a density from about 1 g/cm$^3$ to about 20 g/cm$^3$, such as about 2, 3, 4, 5, 6, 7, 8, 9, 10, 11, 12, 13, 14, or 15 g/cm$^3$.

Some possible powder metallurgy processing techniques that may be applied to the additive manufactured or welded component include hot pressing, cold pressing, low-pressure sintering, extrusion, pressureless sintering, and metal injection molding, for example. Melting may include induction melting, resistive melting, skull melting, arc melting, laser melting, electron beam melting, semi-solid melting, or other types of melting (including conventional and non-conventional melt processing techniques). Casting may include centrifugal, pour, or gravity casting, for example. Sintering may include spark discharge, capacitive-discharge, resistive, or furnace sintering, for example. Mixing may include convection, diffusion, shear mixing, or ultrasonic mixing, for example.

Optionally, porosity may be removed or reduced in the final component. For example, a secondary heat and/or pressure (or other mechanical force) treatment may be done to minimize porous voids present in an additively manufactured component. Also, pores may be removed from the additively manufactured component by physically removing (e.g., cutting away) a region into which porous voids have segregated.

In addition to removal of voids, other post-working may be carried out. For example, forging can refine defects and can introduce additional directional strength, if desired. Preworking (e.g., strain hardening) can be done such as to produce a grain flow oriented in directions requiring maximum strength.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A metal-containing additive manufacturing feedstock containing (a) one or more metals selected from the group consisting of Al, Cu, Ni, Cr, W, and Mo, and (b) and at least two high-vapor-pressure metals that each have a vapor pressure of at least 1 kPa at a temperature of 1000° C., wherein each of said at least two high-vapor-pressure metals is present in a concentration from 2 wt % to 20 wt % in said metal-containing additive manufacturing feedstock, wherein said metal-containing additive manufacturing feedstock includes from 3 wt % to 15 wt % magnesium as a first high-vapor-pressure metal, wherein said metal-containing additive manufacturing feedstock includes zinc as a second high-vapor-pressure metal wherein said additive manufacturing feedstock comprises grain-refining nanoparticles, and wherein said grain-refining nanoparticles are lattice-matched to within ±5% compared to an otherwise-equivalent additive manufacturing feedstock containing said one or more metals and said at least two high-vapor-pressure metals, but not said grain-refining nanoparticles.

2. The metal-containing additive manufacturing feedstock of claim 1, wherein said metal-containing additive manufacturing feedstock contains Al.

3. The metal-containing additive manufacturing feedstock of claim 1, wherein at least one of said high-vapor-pressure metals has a vapor pressure of at least 10 kPa at a temperature of 1000° C.

4. The metal-containing additive manufacturing feedstock of claim 1, wherein at least one of said high-vapor-pressure metals has a vapor pressure of at least 100 kPa at a temperature of 1000° C.

5. The metal-containing additive manufacturing feedstock of claim 1, wherein said metal-containing additive manufacturing feedstock further includes lithium as a third high-vapor-pressure metal.

6. The metal-containing additive manufacturing feedstock of claim 5, wherein said lithium is present from 2 wt % to 15 wt %.

7. The metal-containing additive manufacturing feedstock of claim 1, wherein said grain-refining nanoparticles are selected from the group consisting of zirconium, silver, lithium, manganese, iron, silicon, vanadium, scandium, yttrium, niobium, tantalum, titanium, and oxides, nitrides, hydrides, carbides, or borides thereof, and combinations of the foregoing.

8. The metal-containing additive manufacturing feedstock of claim 1, wherein said zinc is present from 4 wt % to 20 wt %.

9. A metal-containing additive manufacturing feedstock containing aluminum and from 2 wt % to 15 wt % magnesium, from 6 wt % to 20 wt % zinc, and from 2 wt % to 15 wt % lithium, wherein said additive manufacturing feedstock comprises grain-refining nanoparticles, and wherein said grain-refining nanoparticles are lattice-matched to within ±5% compared to an otherwise-equivalent additive manufacturing feedstock containing said aluminum, said magnesium, said zinc, and said lithium, but not said grain-refining nanoparticles.

10. The metal-containing additive manufacturing feedstock of claim 9, wherein said grain-refining nanoparticles are selected from the group consisting of zirconium, silver, lithium, manganese, iron, silicon, vanadium, scandium, yttrium, niobium, tantalum, titanium, and oxides, nitrides, hydrides, carbides, or borides thereof, and combinations of the foregoing.

11. A metal-containing additive manufacturing feedstock containing aluminum and from 3 wt % to 15 wt % magnesium and/or from 7 wt % to 20 wt % zinc, wherein said additive manufacturing feedstock comprises grain-refining nanoparticles, and wherein said grain-refining nanoparticles are lattice-matched to within ±5% compared to an otherwise-equivalent additive manufacturing feedstock containing said aluminum, said magnesium, and said zinc, but not said grain-refining nanoparticles.

12. The metal-containing additive manufacturing feedstock of claim 11, wherein said grain-refining nanoparticles are selected from the group consisting of zirconium, silver, lithium, manganese, iron, silicon, vanadium, scandium, yttrium, niobium, tantalum, titanium, and oxides, nitrides, hydrides, carbides, or borides thereof, and combinations of the foregoing.

13. A metal-containing additive manufacturing feedstock containing (a) one or more metals selected from the group consisting of Al, Cu, Ni, Cr, W, and Mo, and (b) and at least one high-vapor-pressure metal that has a vapor pressure of at least 1 kPa at a temperature of 1000° C., wherein said at least one high-vapor-pressure metal is present in a concentration from 2 wt % to 20 wt % in said metal-containing additive manufacturing feedstock, wherein said metal-containing additive manufacturing feedstock includes Mg, Zn, and Li, wherein said additive manufacturing feedstock comprises grain-refining nanoparticles, and wherein said grain-refining nanoparticles are lattice-matched to within ±5% compared to an otherwise-equivalent additive manufacturing feedstock containing said one or more metals and said at least one high-vapor-pressure metal, but not said grain-refining nanoparticles.

\* \* \* \* \*